June 11, 1929.                J. L. SHROYER                1,717,270
ELECTRIC COOKING DEVICE
Filed March 25, 1927
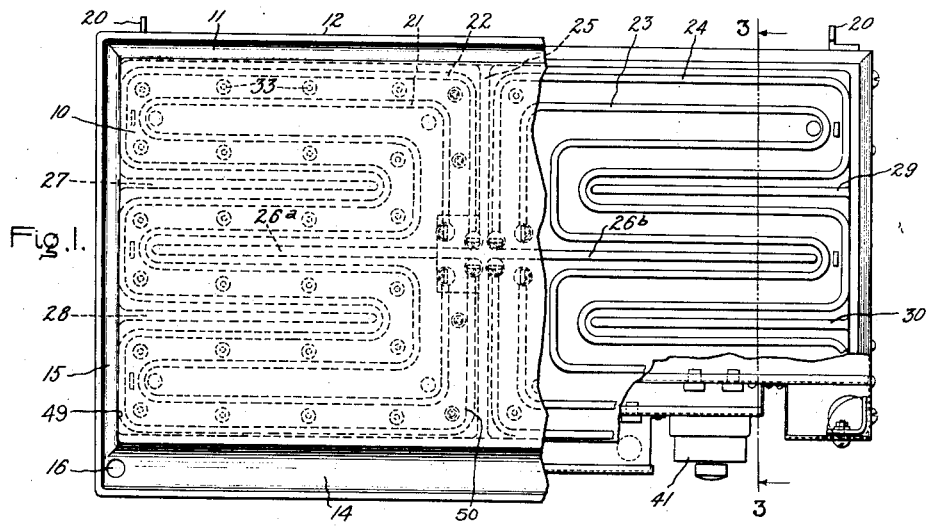
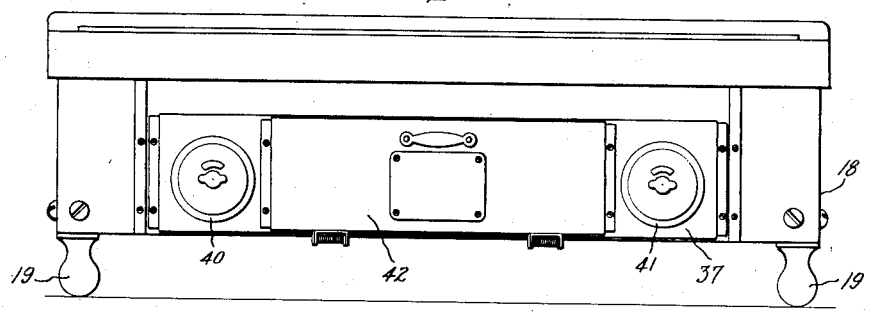
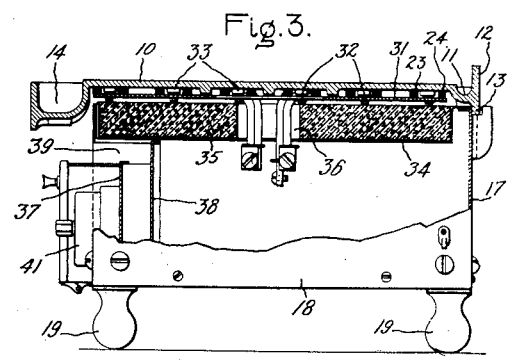
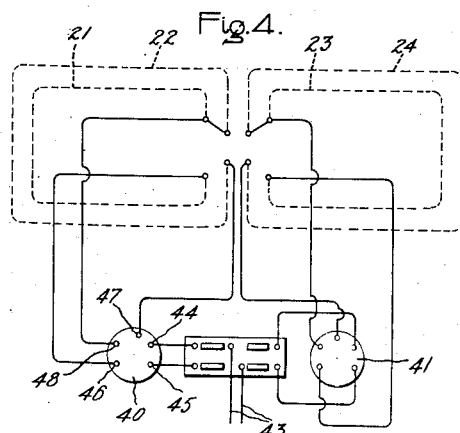
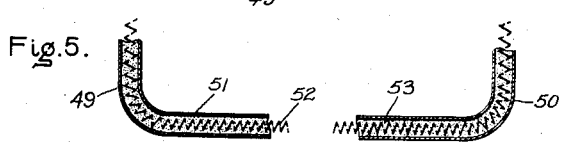
Inventor:
Jacob L. Shroyer,
by
His Attorney.

Patented June 11, 1929.

1,717,270

UNITED STATES PATENT OFFICE.

JACOB L. SHROYER, OF OAK PARK, ILLINOIS, ASSIGNOR TO EDISON ELECTRIC APPLIANCE COMPANY, INCORPORATED, OF CHICAGO, ILLINOIS, A CORPORATION OF NEW YORK.

ELECTRIC COOKING DEVICE.

Application filed March 25, 1927. Serial No. 178,424.

My invention relates to electric cooking devices, more particularly to electric hot plates or griddles, such as used for frying, baking pancakes, etc., and has for its object the provision of a simple, reliable and efficient device of this character.

For a complete understanding of my invention reference should be had to the accompanying drawing in which Fig. 1 is a fragmentary plan view of an electric griddle embodying my invention; Fig. 2 is a front elevation view of the device shown in Fig. 1; Fig. 3 is a sectional view taken along the line 3—3 of Fig. 1 looking in the direction of the arrows; Fig. 4 is a diagrammatic view showing the electrical connections for the heating units; while Fig. 5 is a sectional view of the heating unit.

Referring to the drawing, my invention in one form comprises a cooking or hot plate 10 having an upper flat cooking surface of rectangular form. This plate is made of a suitable metal which is preferably cast into the desired form, such as cast iron. Extending along the back edge of the plate is a relatively shallow groove or trough 11 and also a vertical flange 12 which projects upward above the level of the top surface of the plate for an appreciable distance to form a back stop. This projection 12 prevents food or grease from being pushed off the back side of the plate and also acts as a stop in scraping and cleaning the plate. The flange also projects downward to form a supporting rib 13 for the back side of the plate. At the front of the plate is a relatively deep and wide trough 14 which is connected with the trough 11 at the back by means of a trough 15 at each end of the plate. The troughs carry away the grease and other liquids from the food being cooked, the back and end troughs emptying into the front trough which is provided with a drain opening 16 at one end. It will be understood that a suitable receptacle will be placed under the opening 16. The plate 10 is supported on a metal framework which is provided with closed sheet metal back and end walls 17 and 18. This framework is held above the bench or table on which the griddle is placed by means of knobs 19 secured at the corners. At the back of the support, brackets 20 are provided on which the supporting rib 13 rests. The brackets are provided with recesses at the top to to receive the rib and hence constitute hook-shaped members. This permits the front of the plate to be lifted on the rib 13 as a pivot.

The plate 10 is heated by means of sheathed electric heating units which are bent in zigzag formation and clamped against the lower side of the plate. These units are preferably of the type disclosed in Patent No. 1,367,341 to Abbott, and, briefly, each unit consists of an outer metallic sheath in which a helical resistance conductor is embedded in compacted powdered insulating material. This sheathed unit can be bent readily into any desired formation. As shown, there are four of these sheathed heating units designated by the reference numerals 21, 22, 23 and 24. These units are shaped so that their ends are at the center of the hot plate. The units 21 and 22 are applied to one end of the plate, while the units 23 and 24 are applied to the other end whereby the hot plate is divided into two sections in so far as the generation of heat is concerned.

In order to assist in the spacing of the units in their proper positions, a rib 25 is provided on the bottom of the plate extending centrally thereof from the front to the back. From the center of this rib two ribs $26^a$ and $26^b$ extend at right angles thereto in opposite directions and terminate short distances from the end of the plate. There are also ribs 27 and 28 extending from the end of the plate on opposite sides of the rib $26^a$, these ribs being spaced one third the distance from the central rib $26^a$ to the back and front edges of the plate respectively. Corresponding ribs 29 and 30 are provided on opposite sides of the rib $26^b$.

The two units 21 and 22, constituting a pair, are bent in uniformly spaced relation in a series of loops. It will be observed that the ends of each unit extend from the center of the plate in opposite directions to the front and back thereof, after which each unit is bent into three loops extending lengthwise of the plate, the loops of the unit 21 being inside the loops of the unit 22. The units 23 and 24 at the other end of the plate are arranged in a similar manner. These units are clamped against the lower surface of the plate by means of a clamping plate member 31 which is secured to the bottom of the plate by a plurality of screws 32. Preferably, studs 33 are provided on the bottom of the plate to receive the screws. In order to obtain a better thermal relation between the bottom of the plate which is flat and the metallic sheaths of the heating unit, the sheaths are formed with square or rectangular cross sections, as indicated in Fig. 3, so that one flat side can be clamped in intimate relation with the hot plate. A pan 34 is secured in the top of the support for the plate just below the plate. This pan forms a holder for a quantity of heat insulating material 35 which, for example, may be a magnesium block. An aperture 36 is provided in the center of the block through which the ends of the heating units, which are bent downward at right angles to the plate, extend into the interior of the support.

A recess is provided in the front wall of the support in which is mounted a bracket. This bracket consist of a vertically arranged plate 37 having its ends bent towards the front plate 38 of the support and secured thereto so that the plate 37 is in spaced relation with the plate 38. The plate 38 extends upward closely adjacent the pan 34 while the plate 37 is much shorter and terminates below the pan leaving a space 39 between the upper edge of the plate 37 and the pan. A flue is thus formed between the plates 37 and 38 through which air is free to circulate upward and then out through the space 39 at the front of the griddle. It will be understood that the bottom of the framework is open, and since it is supported on the knobs 19 air has free access to the flue. Supported on the plate 37 are the control switches 40 and 41 for the heating units and a box 42 containing the cutout fuses. By reason of the upward circulation of air between the plate 37 and the plate 38 the switches and fuses are maintained at a desirable low temperature.

As shown in Fig. 4, the heating units 21 and 22, indicated diagrammatically by dotted lines, are controlled by the switch 40, while the heating units 23 and 24, similarly indicated, are controlled by the switch 41 entirely independently of the units 21 and 22. The switches are of any well known three-way type and are so arranged that the two units are connected in series for a low heat, one unit only is connected for a medium heat, while the two units are connected in parallel for a high heat. The connections will be understood, for example, by a brief description of the connections established by the switch 40. Connections are made from the electrical supply source 43 through the fuses to the switch terminals 44 and 45, the switch terminals 46 and 47 are connected to one terminal of the units 21 and 22 respectively, while the terminal 48 is connected to the two remaining terminals of the heating units.

The switch has four positions, an off position, and low, medium, and high heating positions. In the off position the units are disconnected, while in the low heat position the terminals 44 and 47 are connected together and also the terminals 45 and 46 are connected together. In the medium heat position of the switch the terminals 44 and 47 are connected together and also the terminals 45 and 48 are connected together whereby the heating unit 22, which extends around the outer edge of the plate, is energized. For high heat, terminals 45 and 48 are connected together and the terminals 46 and 47 are connected to the terminal 44, whereby the units are connected in parallel. The connection of the outside unit 22 on the medium heat assures that the edge of the plate where the loss of heat is greatest is maintained at the desired temperature. The connections for the units 23 and 24 are the same as previously described for the units 21 and 22.

In order to compensate for the relatively rapid dissipation of heat from the front edge of the plate, due to the proximity of the wide, deep trough 14, the sections of the heating units 22 and 24 adjacent the front edge of the plate are arranged to give higher rate of heat generation than the remaining portion. As shown, the section of the heating unit 22 between the points designated by the reference numerals 49 and 50 is arranged to give a higher rate of heat generation, and a correspondingly situated section of the unit 24 is likewise arranged. This is shown more in detail in Fig. 5. As previously mentioned the heating units are made up of lengths of sheathed resistance conductors comprising an outer metallic sheath 51 in which a helical resistance conductor 52 is embedded in compacted powdered heat refractory insulating material 53. The higher rate of heat generation is obtained by more closely spacing the turns of the resistance conductor 52 in the section betwen the points 49 and 50 as indicated in Fig. 5, the turns in the remaining length of the unit having a wider spacing. This uneven spacing of the turns is effected when the resistance conductor is mounted in the sheath.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States, is:

1. An electric griddle comprising a cooking plate, an electric heating unit for said plate, a metallic framework forming a support for said plate, an upright solid front member for said support, a plate secured to said member in spaced relation therewith so as to form a flue with said member, and switching means for said heating units mounted on said plate.

2. An electric griddle comprising a cooking plate, a heating unit clamped to the bottom of said plate, a support for said plate, a heat insulating member on the top of said support provided with a central aperture, said cooking plate being placed over said heat insulating member, terminals for said heating unit extending downward through said aperture, control means for said heating unit mounted on said support, projections on said support, and a flange on the back edge of said plate resting on said projections so as to form a pivot support for the back edge of said plate.

3. An electric griddle comprising a cooking plate, a downwardly and upwardly extending flange on the back edge of said plate, a support for said plate, and projecting members on the back of said support on which said flange rests whereby said plate can be lifted at the front on said flange as a pivot.

4. A griddle comprising a cast metal cooking plate provided with a shallow trough at the back of said plate and a relatively deep trough at the front connected with said back trough by troughs at the ends of said plate, a downwardly and upwardly projecting flange at the back of said plate, a support for said plate, and hook-shaped members on the back of said support on which said flange rests.

5. An electric griddle comprising a cast metal cooking plate provided with a shallow trough at the back and with a relatively deep trough at the front connected with the back trough by a trough at each end of said plate, a heating unit clamped on the lower side of said plate, a support for said plate, a vertical sheet metal member forming the front of said support, a bracket secured to said member in spaced relation therewith so as to form a flue, switches for said heating unit mounted on said bracket, a heat insulating member on the top of said support below said cooking plate, said insulating member being provided with a central aperture, terminals for said heating unit extending through said aperture, and electrical connections between said terminals and said switches.

6. An electric griddle comprising a cooking plate having a shallow trough at the back and a relatively deep trough at the front connected by troughs at the ends, and a ledge at the back side of said plate projecting upward above the cooking surface of said plate.

7. An electric griddle comprising a cast metal cooking plate, an outer sheathed heating unit extending adjacent the edge of said plate, a second sheathed heating unit arranged to heat the interior of said plate, and a three-way switch for controlling the connections for said units whereby the units are connected in series for low heat, one unit alone is connected for medium heat, and both units are connected in parallel for high heat, said outer unit being energized for the medium heat.

8. An electric griddle comprising a cooking plate provided with a shallow trough at the back and a relatively deep trough extending along the front connected by troughs at the ends, and an electric heating unit for said plate having a higher rate of heat generation at the front of said plate adjacent said relatively deep trough.

9. An electric griddle comprising a metal cooking plate, an inner heating unit secured in thermal relation with a central area of said plate, an outer heating unit extending adjacent the edge of said plate completely surrounding said central area, and means for controlling the connections for said units whereby the units are connected in series for low heat, one unit alone is connected for medium heat, and both units are connected in parallel for high heat, said outer unit being energized for the medium heat.

10. An electric griddle comprising a metal cooking plate, an inner heating unit secured in thermal relation with the central area of said plate, an outer heating unit extending adjacent the edge of said plate completely surrounding said central area, said units being secured to the bottom of said plate, and a three way switch for controlling the connections for said units whereby the units are connected in series for low heat, one unit alone is connected for medium heat, and both units are connected in parallel for high heat, said outer unit being energized for the medium heat.

In witness whereof, I have hereunto set my hand this 21st day of March 1927.

JACOB L. SHROYER.